(No Model.) 2 Sheets—Sheet 1.

W. N. MOORE.
BICYCLE SADDLE.

No. 582,144. Patented May 4, 1897.

Witnesses:

Wm C. Dashiell
H. H. Miller

Inventor
Wm N. Moore

THE NORRIS PETERS CO., PHOTO-LITHO., WASHINGTON, D. C.

(No Model.) 2 Sheets—Sheet 2.
W. N. MOORE.
BICYCLE SADDLE.
No. 582,144. Patented May 4, 1897.
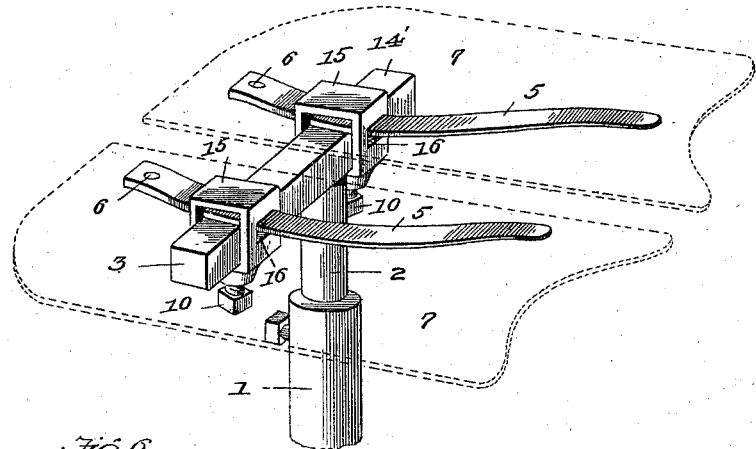
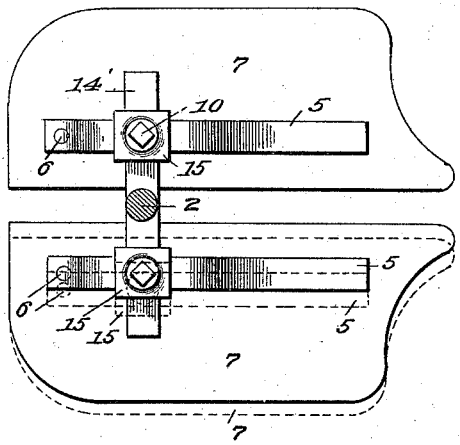
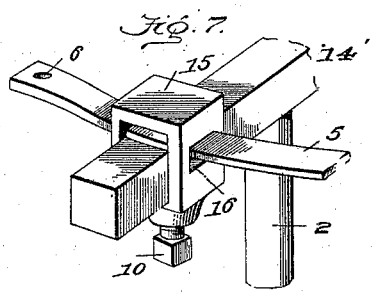
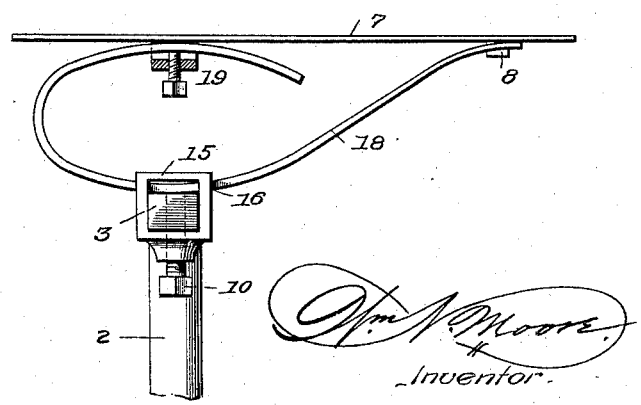
Witnesses — Inventor

UNITED STATES PATENT OFFICE.

WILLIAM N. MOORE, OF WASHINGTON, DISTRICT OF COLUMBIA.

BICYCLE-SADDLE.

SPECIFICATION forming part of Letters Patent No. 582,144, dated May 4, 1897.

Application filed December 9, 1895. Serial No. 571,470. (No model.)

*To all whom it may concern:*

Be it known that I, WILLIAM N. MOORE, a citizen of the United States, residing at Washington, in the District of Columbia, have invented certain new and useful Improvements in Bicycle-Saddles; and I do hereby declare the following to be a full, clear, and exact description of the invention, such as will enable others skilled in the art to which it appertains to make and use the same.

My invention relates to improvements in bicycle-saddles; and one object of my invention is the provision of a saddle which will have a lateral and longitudinal adjustment in order that it may be adjusted to the convenience and comfort of the rider.

Another object of my invention is the provision of a saddle which will have a vibrating spring action in order that it will relieve the pressure upon the limbs of the rider and will also render the riding easy and further prevent injury to the generative organs, and thus overcome a serious defect existing in all saddles in general use.

Another object of my invention is the provision of a saddle which will form a perfect spring-cushion under all circumstances and have a vibrating action, thus insuring ease and comfort to the rider and preventing fatigue and injury to the health.

Another object of my invention is the provision of a saddle which will support the body of the rider upon the pelvis-bones after the manner of a chair.

Another object of my invention is the provision of a saddle which will be so constructed that the two sections may be adjusted laterally to maintain the sections parallel or may have the forward ends retained close together and the rear portions spread apart, or vice versa, according to the desire of the rider.

Another object of my invention is the provision of a saddle which in addition to possessing the advantages stated will be of very simple, inexpensive, and durable construction, thus rendering the improvement entirely beneficial and practical.

The invention consists of a saddle embodying novel features of construction and combination of parts, substantially as disclosed herein.

In order that the peculiar construction of my saddle may be fully understood and its numerous advantages be fully appreciated, I have illustrated in the accompanying drawings a saddle constructed according to my invention.

Figure 1:
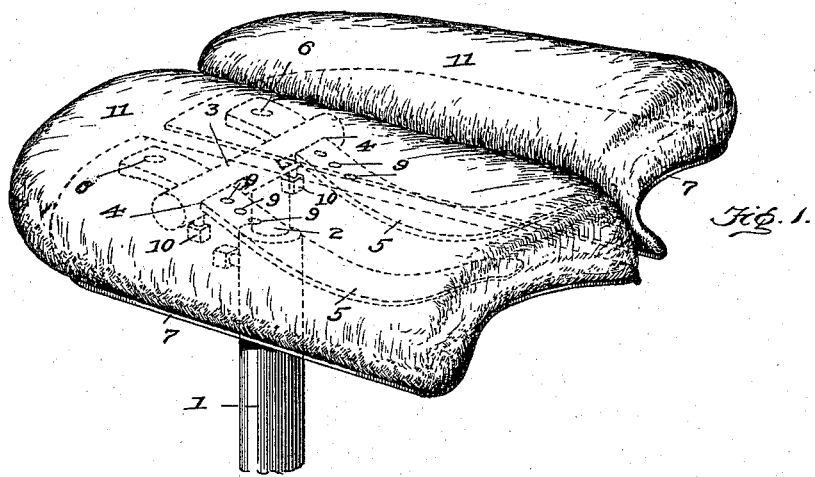
Figure 2:
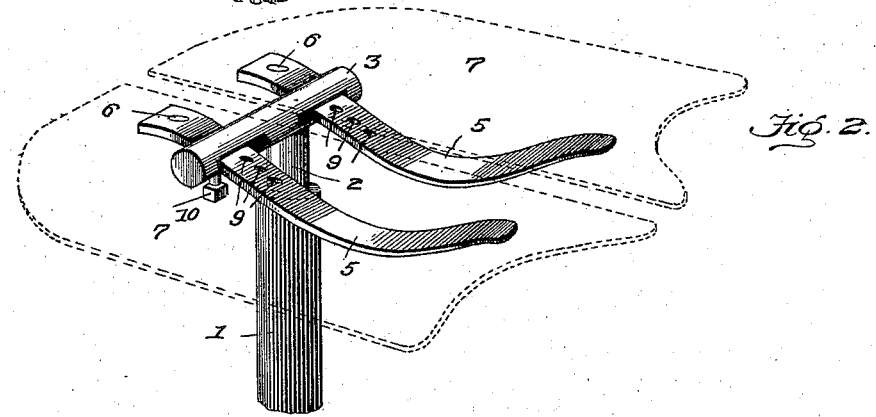
Figure 3:
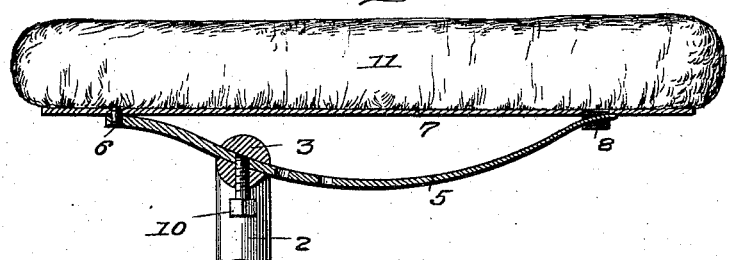
Figure 4:
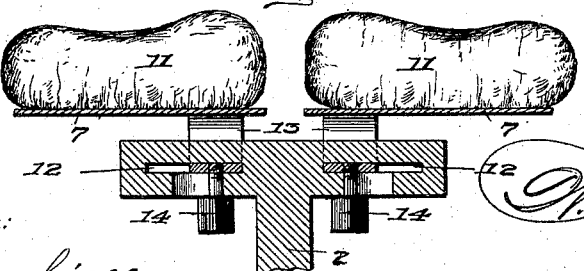

Figure 1 represents a perspective view of my saddle. Fig. 2 represents a perspective view of the support and springs. Fig. 3 represents a longitudinal sectional view of the saddle. Fig. 4 represents a transverse sectional view. Fig. 5 represents a perspective view of a modified construction of my saddle. Fig. 6 represents a bottom plan view of the saddle. Fig. 7 represents a perspective view of another modification of my saddle, and Fig. 8 represents a detail view of a part of the saddle.

Referring by numerals to the drawings, 1 designates the saddle-post, in which fits the vertical arm 2 of the support having also the horizontal arm 3. The arm 3 is provided with openings or rectangular slots 4, in which fit each of the flat springs 5, said springs being curved and having the short or rear end rigidly secured, as at 6, to the under face of the saddle-plates 7 and having their long arm or end bearing against the said saddle-plates and preferably guided by a clip 8, stamped from the plates.

The springs are curved, as shown, and taper in thickness from the rigid end toward the free end in order that they may be rendered sufficiently sensitive to respond instantly and easily to the down pressure of the limbs and also return to their normal position to assist the rider in raising the limbs and thus insure ease and comfort and prevent fatigue.

The springs are rendered longitudinally adjustable by means of the series of openings 9 and the screws 10, and in this manner the spring action can be adjusted to suit the convenience of the rider, which is of vital importance.

Upon the plates are placed the pads or cushions 11, which may be of any desired construction, such as pneumatic, stuffed, or otherwise, as desired.

In Fig. 4 I provide the horizontal arm with long slots 12, which receive the springs 13, and the springs can be moved laterally and returned at any adjustment by means of the set-screw 14, and in this manner the saddle can be adjusted to suit the size of the rider.

In Figs. 5 and 6 I provide a square horizontal bar 14', upon which fit the clamps 15, which also have slots to receive the springs 16, and the construction permits the two parts of the saddle to be adjusted longitudinally and laterally, and the clamps hold the saddle from detachment under all circumstances.

In Fig. 8 I provide the U-shaped springs 18, which have their upper portions connected to the saddle-plates by a screw-and-slot connection 19, and this connection permits the saddle-plates to be adjusted upon the springs.

It will be noticed that the springs are curved, and by this form as the sections are moved longitudinally, either backward or forward on the support, the angle or incline of the sections is changed, thereby permitting any desired incline to be obtained by simply moving the springs a short distance, and this is of vital importance, as riders desire various angles of the saddle to render the saddle comfortable.

It will also be observed that the saddle-sections are capable of various adjustments desired by the rider and also that the springs support the sections throughout their entire length, which is specially desirable.

It is evident that I provide a saddle which forms a perfect cushion under all circumstances and prevents shocks to the rider; also, that it is capable of a longitudinal and lateral adjustment; also, that the saddle assists the rider and hence does not fatigue and will not injure the health of the rider.

It will also be understood that while my saddle is useful to all riders it possesses special advantages for female riders, as by reason of the vibratory spring action and cushion and the lateral and longitudinal adjustment the saddle overcomes all the defects existing in present saddles and provides a saddle which will not impair the health or fatigue the rider.

I claim—

1. A bicycle-saddle, consisting of a support, two curved springs mounted upon said support and adjusted laterally, longitudinally and to various angles or inclines, and two seat-sections having one end rigidly connected to the springs and the other end movably connected; whereby the sections have a spring and vibrating action and are supported in the same plane throughout their length.

2. A bicycle-saddle consisting of a support having a portion for connection with a machine, two clamps having a transverse opening to fit upon the support, and a longitudinally-disposed opening, two springs arranged in said longitudinally-disposed openings, and two seat-sections connected with the springs, said springs having a lateral, longitudinal and incline adjustment on the support.

3. A bicycle-saddle consisting of a transverse support, clamps having transverse openings to fit on said support and a longitudinally-disposed opening, two springs fitting in said longitudinal opening, and two seat-sections having one end rigidly connected to said springs and the other end movably connected in order that the sections may vibrate upon said springs.

In testimony whereof I affix my signature in presence of two witnesses.

WM. N. MOORE.

Witnesses:
 MAY E. MOORE,
 MAUDE C. SKINNER.